US006264521B1

(12) United States Patent
Hernández

(10) Patent No.: US 6,264,521 B1
(45) Date of Patent: Jul. 24, 2001

(54) DOLL WITH VIDEO CONTROL

(76) Inventor: José M. Hernández, 4915 Cora Post Rd., Lodi, CA (US) 95240

( * ) Notice: Subject to any disclaimer, the term of this patent is extended or adjusted under 35 U.S.C. 154(b) by 0 days.

(21) Appl. No.: 09/334,430

(22) Filed: Jun. 15, 1999

(51) Int. Cl.[7] .................................................... A63H 3/00
(52) U.S. Cl. ........................ 446/73; 446/369; 386/107; 348/151
(58) Field of Search ................... 446/71, 72, 73, 446/76, 369, 408, 484, 297; 386/107, 117, 38; 348/143, 151, 150, 220, 13, 14; 369/63, 69

(56) References Cited

U.S. PATENT DOCUMENTS

| | | | |
|---|---|---|---|
| 4,819,076 | * | 4/1989 | Briggs ................................ 358/229 |
| 4,864,333 | * | 9/1989 | Barber ................................ 354/76 |
| 4,982,281 | * | 1/1991 | Gutierrez ............................ 358/108 |
| 5,013,276 | | 5/1991 | Garfinkel . |
| 5,587,740 | * | 12/1996 | Brennan ............................ 348/373 |
| 5,738,526 | | 4/1998 | Cerda et al. . |
| 5,738,561 | | 4/1998 | Pracas . |
| 5,792,047 | * | 8/1998 | Coggins ............................ 600/300 |
| 5,825,408 | * | 10/1998 | Yuyama et al. ................... 348/14 |

\* cited by examiner

Primary Examiner—Sam Rimell
(74) Attorney, Agent, or Firm—Theodore J. Bielen, Jr.

(57) ABSTRACT

An interactive toy utilizing a figure having an outer surface and an inner cavity. A wall portion separates the inner chamber and outer surface and includes at least a pair of orifices. The video camera is located at one of the orifices through the wall portion of the figure and possesses an image capturing lens. The video signal is generated, which may represent a moving or still image. The video monitor is also located at the exterior surface of the figure in spaced relationship with the camera monitor revealed the video image to the person in the vicinity of the doll.

11 Claims, 2 Drawing Sheets

DOLL WITH VIDEO CONTROL

BACKGROUND OF THE INVENTION

The present invention relates to a novel and useful interactive toy which is capable of generating and showing a video image to the user of the toy.

Figurines, dolls, and like toys have been used for generations as play things for children. In general, dolls have been used to mimic human or animal entities. In certain case, dolls have been automated, to produce movement and have also included recording devices to produce sounds.

For example, U.S. Pat. No. 5,013,276 shows an animated doll that possesses articulated arms, legs, and head which are remotely controlled.

U.S. Pat No. 5,738,561 shows a doll having a microphone and sound recording device with a playback speaker, all of which are controlled by the user.

U.S. Pat. No. 5,545,072 describes an image projecting toy in which a film element is internally located and may be viewed through an eye piece from the exterior of the toy.

U.S. Pat. No. 5,738,526 shows a toy doll that displays time by wrist watch combined with a speaking system which iterates time and alarm settings.

A doll or toy which is video interactive would be an advance in the art of recreational items.

BRIEF SUMMARY OF THE INVENTION

The present invention relates to a novel and useful interactive toy.

The toy of the present invention includes a figure having an outer surface, an inner cavity, and a wall portion between these two elements. The figure may be in the form of an animal, a person, or an inanimate object such as a vehicle, and the like. In certain cases the figure may include a head having representations of the eyes, nose, and mouth of a human-like entity.

The toy of the present invention also utilizes a video camera which is located at the wall portion of the figure, for example, at one of the eyes of the figure. The video camera has an image capturing lens at the exterior of the figure and is provided with means for generating a video signal from the image capturing lens. The signal is carried, preferably, through the interior cavity of the toy for use.

A video monitor locates at or recessed below, the exterior surface of the figure and is capable of receiving the video signal from the video camera. The monitor also transduces the video signal into a video image on a video monitor which is apparent to a person facing the toy. Thus, the toy may capture the image of a person holding the toy and display the same on the exterior surface of the toy at the same time. The image, which is eventually displayed on the video monitor, may be a moving image or may be a still image. In the latter case, the video still images may be stored in the form of a video signal representing an object and displayed singularly through a digital system. Likewise, a moving image may be displayed in the same manner. Images may be stored in a recording device within the cavity of the toy and retrieved at a later time by the user of the toy.

The toy may take the form of a rigid figurine or a soft figure. The figure may also include other features associated with toys such as articulation, illumination, and the like.

It may be apparent that a novel and useful interactive toy has been described.

It is therefore an object of the present invention to provide an interactive toy which may be used to generate and display a video image to the user.

Another object of the present invention is to provide a toy which is capable of storing video images for later retrieval for the user.

A further object of the present invention is to provide an interactive toy which includes a video camera which is essentially hidden from view by the user of the toy.

Another object of the present invention is to provide an interactive toy that is capable of producing video images on the exterior surface of the toy, and includes electronic components located in the inner cavity of the toy.

The invention possesses other objects and advantages especially as concerns particular characteristics and features thereof which will become apparent as the specification continues.

Figure 1:
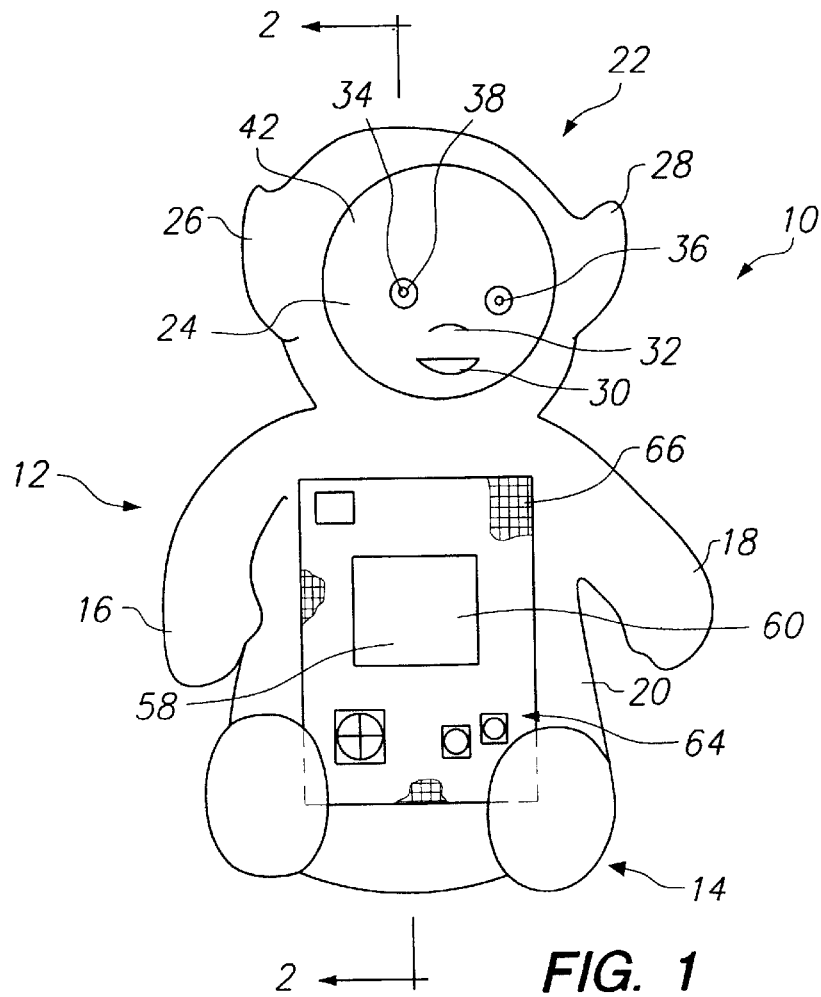
FIG. 1 is a front elevational view of the interactive toy of the present invention.

For a better understanding of the invention reference is made to the following detailed description of the preferred embodiments thereof which should be referenced to the prior described drawings.

DETAILED DESCRIPTION OF THE PREFERRED EMBODIMENTS OF THE INVENTION

Various aspects of the present invention will evolve from the following detailed description of the preferred embodiments thereof which should be taken in conjunction with the hereinabove described drawings.

The invention as a whole is depicted in the drawings by reference character 10. The interactive toy 10 includes as one of its elements a FIG. 12 which may be described as an elf, fairy, or other mythical entity. Of course, FIG. 12 may exist in any format, such as a humanoid representation, an animal, an inanimate object, such as a car, train, airplane, and the like. FIG. 12 is shown as including a pair of feet 14 and arms 16 and 18. Torso 20 terminates in a head portion 22 having a face 24 and a pair of earlike members 26 and 28. Face 24 is shown with a mouth 30, nose 32, and eyes 34 and 36, FIG. 1.

Figure 2:
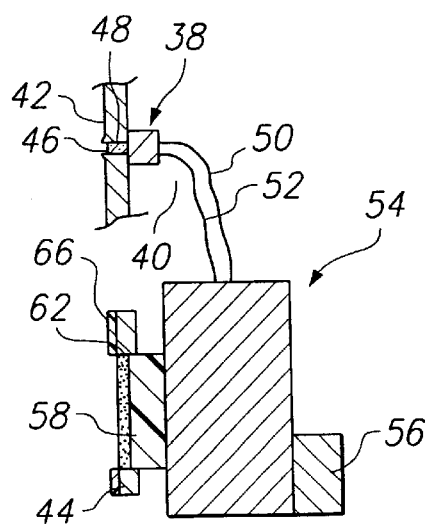
FIG. 2 is a sectional view taken along line 2—2 of FIG. 1.

FIG. 12 is also provided with a video camera 38 positioned within eye 34 of FIG. 12. With reference to FIG. 2, it may be observed that video camera 38 extends from inner cavity 40 of toy 10 to outer surface 42 thereof. A wall portion 44 separates inner cavity 40 from outer surface 42. Video camera possesses an image capturing lens 46 which is located within an orifice 48 of wall portion 44, at or recessed below outer surface 42. Thus, lens 46 is located at outer surface 42 of FIG. 12 or in close proximity thereto. A video signal from camera 34 passes through conductors 50 and 52 to the electronic components 54 necessary for the eventual production of a video image, which will be discussed hereinafter. Battery pack 56 powers video components 54.

A video monitor 58 is also shown on FIGS. 1 and 2. Video monitor 58 receives the video signal from lens 38 and, through the electronic components 54, displays the same on the outer portion or screen 60, thereof. Screen 60 is viewable from the front of FIG. 12 to the user of the same. Monitor 58 is found in orifice 62 which passes from outer surface 42 to inner cavity 40 of FIG. 12 and may be similarly positioned to lens 46 relative to outer surface 42. Returning to FIG. 1, it may be observed that controls 64 are also located on the torso portion 20 of FIG. 12 to permit the manipulator of toy 10 to operate the video components, heretofore described. A protective mesh layer 66 surrounds monitor 58 and permits access to controls 64, while protecting outer surface 42 of FIG. 12 at the torso area 20.

Figure 3:
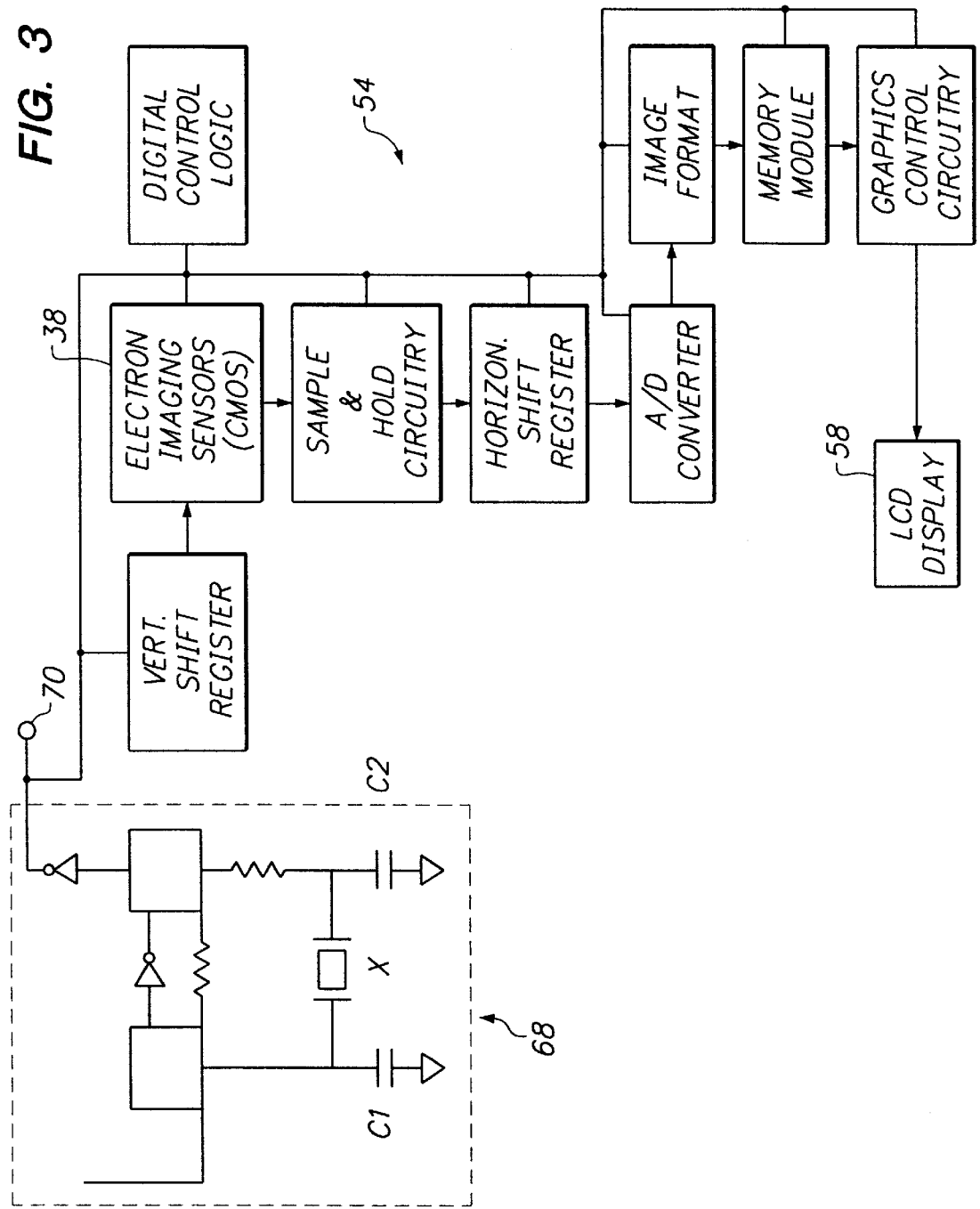
FIG. 3 is a schematic and block diagram depicting the generation and display of a video image on the toy of the present invention.

Turning to FIG. 3, it may be seen that a schematic/block diagram is depicted showing typical electronic components in the system of the present invention. In this regard, video camera 38, conductors 50 and 52, battery 56, video monitor 58, and control 64 may be similar to a video system, model MGB-001, manufactured by Nintendo, Tokyo, Japan. In any case, the system on FIG. 3 indicates a clock generation portion 68 based on a crystal, x1. Clock output is found at node 70 and is fed to the remaining components depicted in the block diagram.

In operation, the user activates toy 10 by the use of control 64 and holds the same or places the same in a position generally at arms length. Video camera 38 within eye 34 of toy 10 creates a video signal and, through electronic components 54, produces a video image on screen 60 of video monitor 58. The user may observe one's self at video monitor 58. In addition, such video image may be a still image, a moving image, both of which may be recorded for replaying at a later time.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. An interactive toy, comprising:
   a. a figure, said figure including an outer surface, an inner cavity, and a wall portion therebetween said figure comprising a replica of a head and a torso;
   b. a video camera, said video camera located at said wall portion of said figure, said camera including an image capturing lens at the outer surface of said figure, said video camera lens coinciding with an anatomical feature found in said replica of a head of said figure, and means for generating a video signal from said image capturing lens; and
   c. a video monitor located at the exterior surface of said figure at said replica of a torso of said figure. said video monitor receiving said video signal from the video camera and transducing said video signal into a video image.

2. The toy of claim 1 in which said figure wall portion includes an orifice communicating between said inner cavity and said outer surface.

3. The toy of claim 2 in which said image capturing lens of said camera being located in said orifice.

4. The toy of claim 3 in which said figure orifice in a first orifice and said figure further comprises a second orifice communicating between said inner cavity and said outer surface, said first orifice being spaced from said second orifice, said video monitor being located in said second orifice.

5. The toy of claim 1 which additionally comprises recording means for storing said video signal and means for recovering said video signal from said recording means for display on said video monitor.

6. The toy of claim 1 in which said means for generating a video signal includes means for generating a moving video image for display on said video monitor.

7. The toy of claim 1 in which said means for generating a video signal includes means for generating a still video image for display on said video monitor.

8. The toy of claim 5 in which said figure wall portion includes an orifice communicating between said inner cavity and said outer surface.

9. The toy of claim 2 in which said image capturing lens of said camera being located in said orifice.

10. The toy of claim 7 in which said figure orifice includes a first orifice and said figure further comprises a second orifice communicating between said inner cavity and said outer surface, said first orifice being spaced from said second orifice, said video monitor being located in said second orifice.

11. The toy of claim 1 which additionally comprises a matrix positioned to the outer surface of the figure in the vicinity of said video monitor.

* * * * *